(12) United States Patent
Duff et al.

(10) Patent No.: US 6,711,359 B1
(45) Date of Patent: Mar. 23, 2004

(54) OPTICAL FIBER COMMUNICATION SYSTEM EMPLOYING DOPED OPTICAL FIBER AND RAMAN AMPLIFICATION

(75) Inventors: Donald G. Duff, Lincroft, NJ (US); Howard D. Kidorf, Red Bank, NJ (US); Xiaobing Ma, Morganville, NJ (US); Karsten Rottwitt, Basking Ridge, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/266,093

(22) Filed: Mar. 10, 1999

(51) Int. Cl.[7] ............................................. H04B 10/17
(52) U.S. Cl. ........................ 398/178; 398/67; 398/180
(58) Field of Search .................................. 359/113, 114, 359/179, 174, 341, 345

(56) References Cited

U.S. PATENT DOCUMENTS

| | | | | |
|---|---|---|---|---|
| 5,500,756 A | * | 3/1996 | Tsushima et al. ............ 359/174 |
| 5,991,070 A | * | 11/1999 | Zanoni et al. ......... 359/341.33 |
| 6,067,389 A | * | 5/2000 | Fatehi et al. .................... 385/17 |
| 6,084,233 A | * | 7/2000 | Hodgson et al. ........ 250/227.14 |
| 6,101,025 A | * | 8/2000 | Naganuma .............. 359/341.33 |
| 6,188,510 B1 | * | 2/2001 | Edagawa et al. ....... 359/341.33 |

* cited by examiner

Primary Examiner—Leslie Pascal

(57) ABSTRACT

A lightwave communication system is provided that includes first and second optical transmitters/receivers remotely located with respect to one another. First and second optical transmission paths couple the first transmitter/receiver to the second transmitter/receiver for bidirectionally transmitting optical information therebetween. First and second doped optical fibers are respectively disposed in the first and second optical transmission paths. Optical pump energy is supplied by first and second optical pump sources. The first optical pump source generates Raman gain in the first transmission path and the second optical pump source generates Raman gain in the second transmission path. A first optical coupler is provided for optically coupling pump energy from the first pump source to the second-doped optical fiber and a second optical coupler is provided for optically coupling pump energy from the second pump source to the first doped optical fiber.

42 Claims, 2 Drawing Sheets

OPTICAL FIBER COMMUNICATION SYSTEM EMPLOYING DOPED OPTICAL FIBER AND RAMAN AMPLIFICATION

FIELD OF THE INVENTION

This invention relates to optical fiber communication systems, and more particularly to an optical fiber-communication system that employs remote pumping of the optical amplifiers.

BACKGROUND OF THE INVENTION

Commercial lightwave systems use optical fibers to carry large amounts of multiplexed digital data over long distances from a transmit terminal to a receive terminal. The maximum distance that the data can be transmitted in the fiber without amplification or regeneration is limited by the loss associated with the optical fiber (along with chromatic dispersion and optical nonlinearity). To transmit optical signals over long distances, the lightwave systems may include a number of repeaters periodically located along the fiber route from the transmitting terminal to the receiving terminal. Each repeater boosts the weak signal to compensate for the transmission losses which occurred enroute from the last repeater. Prior to the widespread availability of efficient optical amplifiers, many systems converted the optical signals into electrical signals for amplification by conventional electrical amplifiers. The amplified electrical signals were then reconverted to the optical domain, for further distribution along the optical communication path. The advent of reliable and low cost optical amplifiers has obviated the need to convert signals into the electrical domain for amplification. However, optical amplifiers, such as rare earth doped optical fiber amplifiers, require a source of pump energy. In a rare earth doped optical fiber amplifier, for example, a pump laser is coupled to the doped fiber for exciting the rare earth element within the amplifier. At the same time, a communication signal is passed through the doped fiber. The pumped fiber exhibits gain at the wavelength of the communication signal, providing the desired amplification.

One disadvantage in using pumped optical amplifiers is that electrical energy must be provided at the amplifier location in order to operate the pump laser. This requirement can be particularly burdensome if the transmission system, and hence the optical amplifiers, is located undersea. In undersea transmission systems, power must be supplied to remote undersea locations. Furthermore, repair of active components such as pump lasers can be prohibitively time-consuming and expensive. U.S. application Ser. No. [Kerfoot 4] overcomes this disadvantage by eliminating the need to have all elements of the individual optical amplifiers co-located. In this reference, an optical fiber pump path, which is distinct from the optical transmission path, optically couples the pump source to the plurality of doped optical fibers. Accordingly, the active components, i.e., the optical pump source, may be remotely located from the passive components, i.e., the doped optical fibers and couplers. It would be desirable, however, to eliminate the need for a dedicated pump path.

SUMMARY OF THE INVENTION

In accordance with the present invention, a lightwave communication system is provided that includes first and second terminals remotely located with respect to one another. First and second optical transmission paths couple the first terminal to the second terminal for bidirectionally transmitting optical information therebetween. First and second doped optical fibers are respectively disposed in the first and second optical transmission paths. Optical pump energy is supplied by first and second optical pump sources. The first optical pump source generates Raman gain in the first transmission path and the second optical pump source generates Raman gain in the second transmission path. A first optical coupler is provided for optically coupling pump energy from the first transmission path to the second doped optical fiber and a second optical coupler is provided for optically coupling pump energy from the second transmission path to the first doped optical fiber.

DETAILED DESCRIPTION

Figure 1:
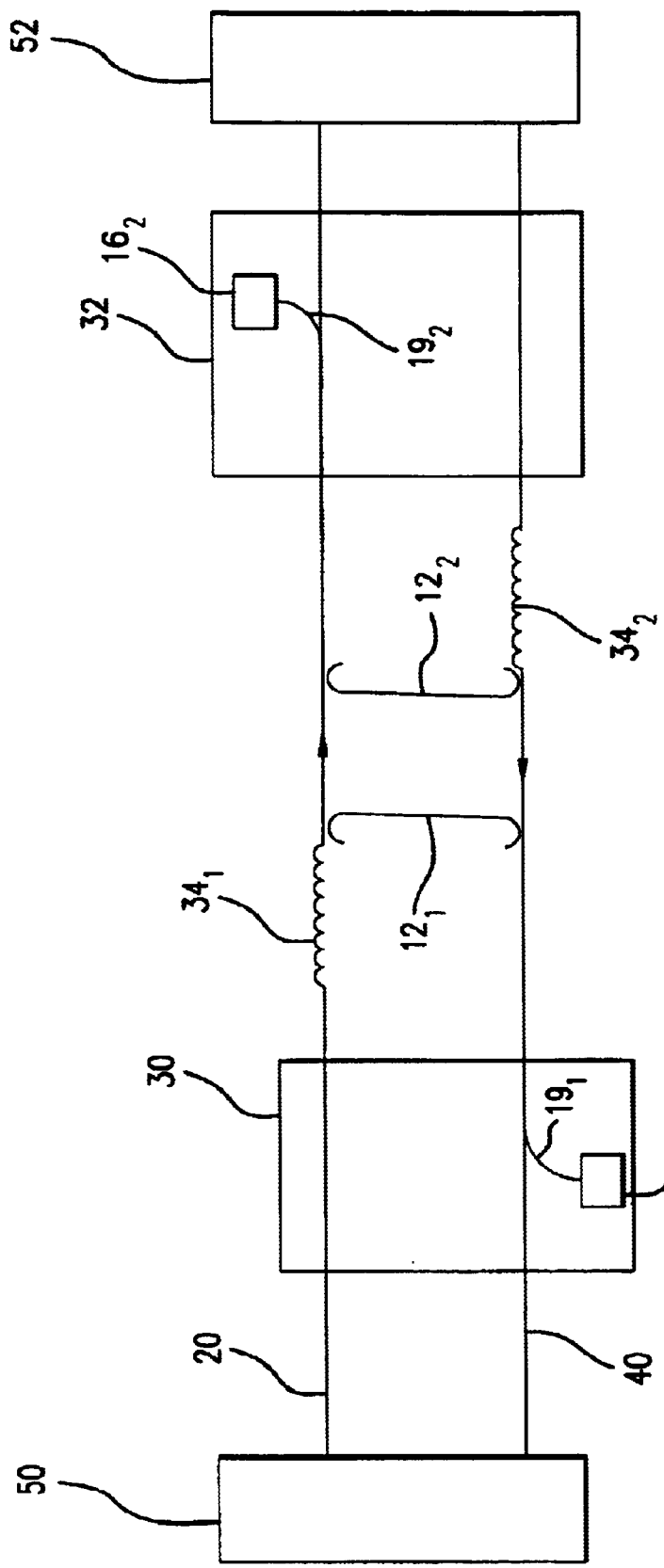
FIG. 1 shows a lightwave communication system constructed in accordance with the present invention.

Referring to FIG. 1, there is disclosed a lightwave communication system which utilizes optical fiber amplifiers for providing gain. The system includes transmitter/receiver terminals 50 and 52 and optical transmission fiber paths 20 and 40 supporting bidirectional communication. A plurality of doped optical fibers $34_1$ and $34_2$ are interposed in the fiber paths 20 and 40, respectively. Each doped optical fiber 34 serves as an optical amplifier when properly coupled to a source of optical pump energy such as pump sources $16_1$ and $16_2$. As indicated in the embodiment of the invention shown in FIG. 1, pump sources $16_1$ and $16_2$ may be incorporated in pump source housings 30 and 32, respectively, which can also be used to house components such as a pump controller and components associated with transmission performance monitoring techniques, for example. As shown, pump source $16_1$ supplies pump energy to fiber path 40 via coupler $19_1$ and pump source $16_2$ supplies pump energy to fiber path 20 via coupler $19_2$. The signals being transmitted from the terminals 50 and 52 are in optical form. While only two sets of pumps, couplers and doped optical fibers are depicted in FIG. 1 for clarity of discussion, it should be understood by those skilled in the art that the present invention finds application in transmission paths of all lengths having many additional sets of such components.

In accordance with the present invention, the transmission paths 20 and 40 are themselves used to conduct the pump power. Each pump 16 supplies pump power to achieve both Raman gain and gain via stimulation of rare-earth doped fibers. Specifically, pump $16_1$ supplies Raman gain to fiber transmission path 40 and stimulated gain to transmission path 20. Raman gain is provided in fiber transmission path 40 due to the presence of high power in the fiber. A directional coupler $12_1$ is situated at a point along the fiber path 40 at which the pump power has fallen to an impractically low level for providing Raman gain. The excess pump power that is insufficient to generate Raman gain is therefore coupled by directional coupler $12_1$ to transmission path 20 for supplying pump power to doped optical fiber $34_1$ to generate stimulated gain. The erbium doped fiber can make more efficient :use of pump power than Raman gain and therefore requires a lower level of pump power to generate the same level of gain. For example, whereas it is usually necessary to provide at least 100 mw of pump power to generate significant Raman gain, a pump power of only 10–20 mw may be sufficient to generate significant gain by the stimulation of erbium ions. Since doped optical fibers require substantially less pump power to achieve a given level of gain, this arrangement makes very efficient use of the available power in comparison to an arrangement that only generates Raman gain.

The operation of pump $16_2$, which is situated along transmission path 20, is similar to the operation of pump $16_1$ as described above. That is, pump $16_2$ supplies Raman gain to fiber transmission path 20 and stimulated gain to transmission path 40. A directional coupler $12_2$ is situated at a point along the fiber path 20 at which the pump power has fallen below a useful level. The excess pump power that is insufficient to generate Raman gain is therefore coupled by directional coupler $12_2$ to transmission path 40 for supplying pump power to doped optical fiber $34_2$ to generate stimulated gain.

In the embodiment of the invention shown in FIG. 1, the pump energy from pump $16_1$ generating Raman gain propagates contra-directionally with respect to the signal in transmission path 40. Pump energy supplied by pump $16_1$ to doped optical fiber $34_1$ via directional coupler $12_1$ propagates contra-directionally with respect to the signal in transmission path 20. Likewise, the pump energy supplying Raman gain in transmission path 20 propagates contra-directionally while the pump energy supplied to doped optical fiber $34_2$ via directional coupler $12_2$ propagates contra-directionally with respect to the signal in transmission path 40. Accordingly, the FIG. 1 configuration avoids forward pumped Raman gain. While one of ordinary skill in the art will recognize that this configuration may be reversed (e.g., so that the Raman pump energy propagates co-directionally with respect to the signal in transmission path 40), the particular arrangement shown in FIG. 1 is advantageous because forward Raman gain increases noise and hence reduces system performance.

Figure 2:
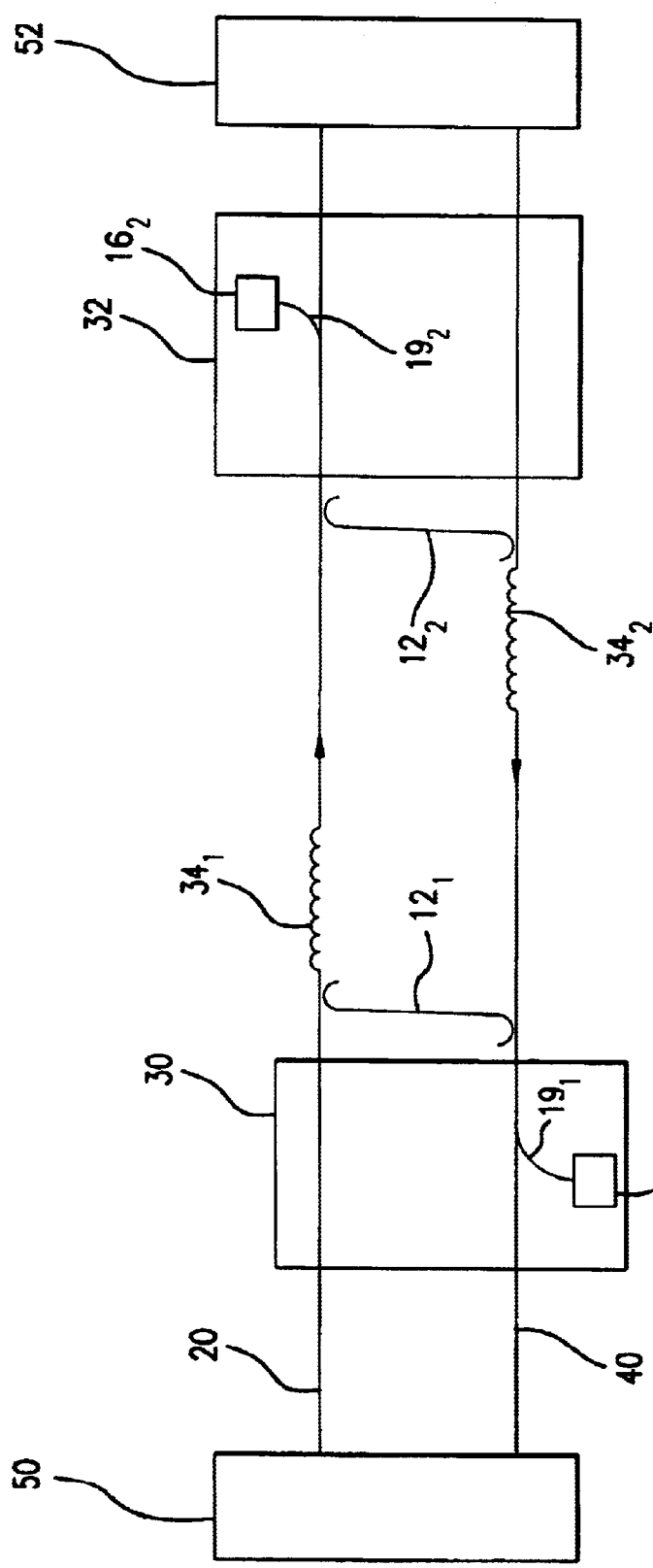
FIG. 2 shows an alternative embodiment of the invention shown in FIG. 1.

FIG. 2 shows an alternative embodiment of the invention in which the pump energy supplied to the doped fibers $34_1$ and $34_2$ propagates co-directionally with respect to the signals propagating therein while the direction of the pump energy supplying Raman gain remains unchanged from FIG. 1. As shown, this embodiment differs from the embodiment of FIG. 1 by reversing the direction of couplers $12_1$ and $12_2$.

The doped optical fibers 34 illustratively shown in FIGS. 1 and 2 can be rare earth doped optical fibers, where the doping material can be, for example, erbium. The resulting optical amplifiers, which constitute doped optical fiber amplifiers, have low noise properties, relatively broad gain that is not polarization dependent, negligible pulse distortion and relatively low coupling losses to the transmission fiber. In operation, the rare earth doped fiber optical amplifiers, which can. have a length of, for example, 10 to 50 meters, are coupled end-to-end to the transmission fiber path and are normally traversely coupled, through the directional couplers 12 to the laser pumps 16 so that a weak optical input signal experiences a gain. The directional couplers 12 are designed to have a high coupling ratio at the pump wavelength and a low coupling ratio:at the signal wavelength. The rare earth doped fibers 34 can be coupled to the optical fiber transmission path via core-to-core splices.

The pump energy from pump sources 16 is provided at a wavelength which-will pump the doped optical fibers 34 that are-provided along the fiber path 20. For example, if the doped optical fibers are doped with erbium, pump sources 16 will advantageously output pump energy at a wavelength of about 1480 nanometers to provide optical amplification for signals at 1530–1560 nm. A pump wavelength of 1480 nm is also appropriate to provide Raman amplification for these signals.

In some embodiments of the invention additional doped optical fibers may be employed to serve as additional optical amplifiers. For example, doped optical fibers may be co-located with the pumps 16 or upstream (with respect to the signal direction) from pumps $16_1$ and $16_2$. The additional doped optical fibers will receive pump energy, from additional pump sources or pump sources 16.

What is claimed is:

1. A lightwave communication system, comprising:
   first and second terminals remotely located with respect to one another;
   first and second optical transmission paths coupling said first terminal to said second terminal for bidirectionally transmitting optical information therebetween;
   first and second doped optical fibers respectively disposed in said first and second optical transmission paths;
   first and second optical pump sources for supplying optical pump energy, said first optical pump source generating Raman gain in said first transmission path and said second optical pump source generating Raman gain in said second transmission path;
   a first optical coupler disposed between said first optical pump source and said first doped optical fiber for optically coupling pump energy from said first transmission path to said second doped optical fiber for causing stimulated gain in said second transmission path and a second optical coupler disposed between said second optical pump source and said second doped optical fiber for optically coupling p-ump energy from said second Admission path to said first doped optical fiber for causing stimulated gain in said first transmission path.

2. The system of claim 1 wherein said first optical pump source generates Raman gain by providing optical pump energy that propagates contra-directionally with respect to optical information signals.

3. The system of claim 2 wherein said second optical pump source generates Raman gain by providing optical pump energy that propagates contra-directionally with respect to optical information signals.

4. The system of claim 3 wherein said doped optical fibers are rare-earth doped optical fibers.

5. The system of claim 4 wherein said rare-earth doped optical fibers are doped with erbium.

6. The system of claim 1 wherein said-first and second optical couplers are directional couplers located at a position along said first and second transmission paths, respectively, where optical pump energy is below a level generating a prescribed amount of Raman gain.

7. The system of claim 6 wherein the prescribed amount of Raman gain is substantially equal to zero.

8. The system of claim 1 wherein said doped optical fibers are rare-earth doped optical fibers.

9. The system of claim 8 wherein said rare-earth doped optical fibers are doped with erbium.

10. The system of claim 1 wherein said first optical pump source generates Raman gain by providing optical pump energy that propagates co-directionally with respect to optical information signals.

11. The system of claim 10 wherein said second optical pump source generates Raman gain by providing optical pump energy that propagates co-directionally with respect to optical information signals.

12. The system of claim 1 further comprising third and fourth optical couplers for coupling the optical pump energy from the first and second optical pump sources to the first and second optical transmission paths, respectively.

13. In a lightwave communication system that includes first and second terminals remotely located with respect to one another and coupled together by first and second optical transmission paths for bidirectionally transmitting optical information therebetween, an optical amplifier arrangement comprising:

first and second doped optical fibers respectively disposed in said first and second optical transmission paths;

first and second optical pump sources for supplying optical pump energy, said first optical pump source generating Raman gain in said first transmission path and said second optical pump source generating Raman gain in said second transmission path;

a first optical coupler disposed between said first optical pump source and said first doped optical fiber for optically coupling pump energy from said first transmission path to said second doped optical fiber for causing stimulated gain in said second transmission path and a second optical coupler disposed between said second optical pump source and said second doped optical fiber for optically coupling pump energy from said second transmission path to said first doped optical fiber for causing stimulated gain in said first transmission path.

14. The optical amplifier arrangement of claim 13 wherein said first optical pump source generates Raman gain by providing optical pump energy that propagates contra-directionally with respect to optical information signals.

15. The optical amplifier arrangement of claim 14 wherein said second optical pump source generates Raman gain by providing optical pump energy that propagates contra-directionally with respect to optical information signals.

16. The optical amplifier arrangement of claim 15 wherein said doped optical fibers are rare-earth doped optical fibers.

17. The optical amplifier arrangement of claim 16 wherein said rare-earth doped optical fibers are doped with erbium.

18. The optical amplifier arrangement of claim 13 wherein said first and second optical couplers are directional couplers located at a position along said first and second transmission paths, respectively, where optical pump energy is below a level generating a prescribed amount of Raman gain.

19. The optical amplifier arrangement of claim 18 wherein the prescribed amount of Raman gain is substantially equal to zero.

20. The optical amplifier arrangement of claim 13 wherein said doped optical fibers are rare-earth doped optical fibers.

21. The optical amplifier arrangement of claim 20 wherein said rare-earth doped optical fibers are doped with erbium.

22. The optical amplifier arrangement of claim 13 wherein said first optical pump source generates Raman gain by providing optical pump energy that propagates co-directionally with respect to optical information signals.

23. The optical amplifier arrangement of claim 22 wherein said second optical pump source generates Raman gain by providing optical pump energy that propagates co-directionally with respect to optical information signals.

24. The optical amplifier arrangement of claim 13 further comprising third and fourth optical couplers for coupling the optical pump energy from the first and second optical pump sources to the first and second optical transmission paths, respectively.

25. A method for amplifying optical signals propagating in a lightwave communication system that includes first and second terminals remotely located with respect to one another and coupled together by first and second optical transmission pats for bidirectionally transmitting optical information therebetween, said method comprising:

supplying optical pump energy from first and second optical pump sources such that the first optical pump source generates Reman gain in the first transmission path and the second optical pump source generates Raman gain in the second transmission path;

providing a first optical coupler disposed between the first optical pump source and a first doped optical fiber disposed in the first optical transmission path for optically coupling pump energy from the first transmission path to a second doped optical fiber disposed in the second optical transmission path for causing stimulated gain in the second transmission path providing a second optical coupler disposed between the second optical pump source and the second doped optical fiber for optically coupling pump energy from the second transmission path to said fist doped optical fiber for causing stimulated gain in the first transmission path.

26. The method of claim 25 wherein said first optical pump source generates Raman gain by providing optical pump energy that propagates contra-directionally with respect to optical information signals.

27. The method of claim 26 wherein said second optical pump source generates Raman gain by providing optical pump energy that propagates contra-directionally with respect to optical information signals.

28. The method of claim 27 wherein said doped optical fibers are rare-earth doped optical fibers.

29. The method of claim 28 wherein said rare-earth doped optical fibers are doped with erbium.

30. The method of claim 25 wherein said first and second optical couplers are directional couplers located at a position along said first and second transmission paths, respectively, where optical pump energy is below a level generating a prescribed amount of Raman gain.

31. The method of claim 30 wherein the prescribed amount of Raman gain is substantially equal to zero.

32. The method of claim 25 wherein said doped optical fibers are rare-earth doped optical fibers.

33. The method of claim 32 wherein said rare-earth doped optical fibers are doped with erbium.

34. The method of claim 25 wherein said first optical pump source generates Raman gain by providing optical pump energy that propagates co-directionally with respect to optical information signals.

35. The method of claim 34 wherein said second optical pump source generates Raman gain by providing optical pump energy that propagates co-directionally with respect to optical information signals.

36. The method of claim 25 further comprising the steps of coupling the optical pump energy from the first and second optical pump sources to the first and second optical transmission paths, respectively.

37. A lightwave communication system, comprising:

first and second terminals remotely located with respect to one another;

first and second optical transmission paths coupling said first terminal to said second terminal for bidirectionally transmitting optical information therebetween;

first and second doped optical fibers respectively disposed in said first and second optical transmission paths;

first and second optical pump sources for supplying optical pump energy, said first optical pump source generating Raman gain in said first transmission path and said second optical pump source generating Raman gain in said second transmission path;

a first optical coupler for optically coupling pump energy from said first transmission path to said second doped optical fiber and a second optical coupler for optically coupling pump energy from said second transmission path to said first doped optical fiber, wherein said first and second optical couplers are directional couplers located at a position along said first and second transmission paths, respectively, where optical pump energy is below a level generating a prescribed amount of Raman gain.

38. The system of claim 37 wherein the prescribed amount of Raman gain is substantially equal to zero.

39. In a lightwave communication system that includes first and second terminals remotely located with respect to one another and coupled together by first and second optical transmission paths for bidirectionally transmitting optical information therebetween, an optical amplifier arrangement comprising:

first and second doped optical fibers respectively disposed in said first and second optical transmission paths;

first and second optical pump sources for supplying optical pump energy, said first optical pump source generating Raman gain in said fist transmission path and said second optical pump source generating Raman gain in said second transmission path;

a first optical coupler for optically coupling pump energy from said first transmission path to said second doped optical fiber and a second optical coupler for optically coupling pump energy from said second transmission path to said first doped optical fiber, wherein said first and second optical couplers are directional couplers located at a position along said fist and second transmission paths, respectively, where optical pump energy is below a level generating a prescribed amount of Raman gain.

40. The optical amplifier arrangement of claim 39 wherein the prescribed amount of Raman gain is substantially equal to zero.

41. A method for amplifying optical signals propagating in a lightwave communication system that includes first and second terminals remotely located with respect to one another and coupled together by fist and second optical transmission paths for bidirectionally transmitting optical in information therebetween, said method comprising the steps of:

a supplying optical pump energy from first and second optical pump sources such that the first optical pump source generates Raman in the first transmission path and the second optical pump source generates Raman gain in the second transmission path;

optically coupling pump energy from the first transmission path to a second doped optical fiber disposed in the second optical transmission path;

optically coupling pump energy from the second transmission path to a first doped optical fiber disposed in the first optical transmission path, wherein said first and second optical couplers are directional couplers located at a position along said first and second transmission paths, respectively, where optical pump energy is below a level generating a prescribed amount of Raman gain.

42. The method of claim 30 wherein the prescribed amount of Raman gab is substantially equal to zero.

* * * * *